United States Patent
Hagger et al.

(10) Patent No.: US 10,556,355 B2
(45) Date of Patent: Feb. 11, 2020

(54) FOOD PUSHERS AND FOOD HOLDER SYSTEMS AND MANDOLINES INCORPORATING THE SAME

(71) Applicant: DKB Household UK Limited, Hampshire (GB)

(72) Inventors: Sam Hagger, Bridgend (GB); Julian David Sanders, Hampshire (GB); Matthew Ian Blofeld, Vale of Glamorgan (GB)

(73) Assignee: DKB HOUSEHOLD UK LIMITED (GB)

(*) Notice: Subject to any disclaimer, the term of this patent is extended or adjusted under 35 U.S.C. 154(b) by 362 days.

(21) Appl. No.: 15/433,803

(22) Filed: Feb. 15, 2017

(65) Prior Publication Data

US 2017/0282394 A1 Oct. 5, 2017

(30) Foreign Application Priority Data

Feb. 16, 2016 (EP) .................................. 16155923

(51) Int. Cl.
| | | |
|---|---|---|
| *B26D 7/01* | (2006.01) | |
| *B26D 3/28* | (2006.01) | |
| *A47J 43/25* | (2006.01) | |
| *B26D 7/26* | (2006.01) | |
| *B26D 7/06* | (2006.01) | |

(52) U.S. Cl.
CPC .............. *B26D 3/283* (2013.01); *A47J 43/25* (2013.01); *B26D 7/01* (2013.01); *B26D 7/2628* (2013.01); *B26D 7/0616* (2013.01); *B26D 2003/285* (2013.01); *B26D 2003/287* (2013.01)

(58) Field of Classification Search
CPC .............. B26D 3/283; B26D 2003/285; B26D 2003/287; B26D 7/01; B26D 7/2628
USPC ........ 99/537, 543, 510; 83/858, 932, 435.11
See application file for complete search history.

(56) References Cited

U.S. PATENT DOCUMENTS

| | | | | |
|---|---|---|---|---|
| 203,767 | A * | 5/1878 | Pierson ................... | B26D 3/283 |
| 4,691,870 | A * | 9/1987 | Fukunaga .............. | A47J 43/046 |
| | | | | 241/282.2 |
| 6,732,622 | B2 * | 5/2004 | Vincent ................... | A47J 43/25 |
| | | | | 30/279.6 |
| 7,837,137 | B2 * | 11/2010 | Klotz ...................... | A47J 43/25 |
| | | | | 241/273.1 |
| 2007/0125207 | A1 | 6/2007 | Lucas et al. | |

(Continued)

FOREIGN PATENT DOCUMENTS

| | | |
|---|---|---|
| EP | 2902158 A1 | 8/2015 |
| FR | 2861629 A1 | 5/2005 |

(Continued)

OTHER PUBLICATIONS

Extended European Search Report, European Application No. EP 16155923, European Patent Office, dated Jun. 22, 2016, 6 pages.

*Primary Examiner* — Reginald Alexander
(74) *Attorney, Agent, or Firm* — Dorsey & Whitney LLP

(57) ABSTRACT

A mandoline has a food holder and a food pusher, the food holder being slidable along the body and the food pusher being rotatably mounted on the food holder, the food pusher having a first pusher wall and a second pusher wall, the second pusher wall being in the form of a substantially flat plate and the first pusher wall being arranged perpendicular to the second pusher wall and being jaw-shaped in nature.

14 Claims, 13 Drawing Sheets

(56) References Cited

U.S. PATENT DOCUMENTS

2008/0066603 A1* 3/2008 Koerselman ........... B26D 3/283
83/856

FOREIGN PATENT DOCUMENTS

GB    2375950 A    12/2002
JP    1-16705    *  2/1994 ............. B26D 3/283

* cited by examiner

FOOD PUSHERS AND FOOD HOLDER SYSTEMS AND MANDOLINES INCORPORATING THE SAME

CROSS REFERENCE TO RELATED APPLICATION

This application claims priority under 35 U.S.C. § 119 (a)-(d) to European patent application number 16155923.2, filed on Feb. 16, 2016, which is hereby incorporated by reference herein in its entirety.

TECHNICAL FIELD

The present invention relates to food pushers for moving food relative to work surfaces, as well as to food holder systems and mandolines incorporating the same.

BACKGROUND

A known food pusher has a circular pusher wall for pushing food down towards a work surface of a mandoline, a bias being provided for biasing the wall down towards the work surface. The food pusher may be guided relative to the work surface by a food holder for sliding the food pusher along above the work surface of the mandoline. This arrangement is effective in many situations but it is difficult to use the food pusher to work on long food, such as carrots or cucumbers.

A further known system has a food pusher which is rotatable relative to a food holder for guidably sliding the food pusher along relative to a mandoline work surface. The food pusher is rotatable relative to the holder and includes a small vertical circular through-bore such that some vertical food, such as relatively thin asparagus or thin carrots, may be guided along the work surface of the mandoline by the food pusher. However, the circular through-bore is only able to have a diameter of about 4 cm and there are many foods such as large carrots, cucumber or courgettes which cannot easily be processed. The present inventors have thought of simply scaling up this design, but this would have the disadvantages of extra size and cost of the whole arrangement including the mandoline. There is also a difficulty that the user needs particular care in using the arrangement not to squash relatively delicate foods such as tomatoes and strawberries which may require slicing by the mandoline.

The present invention aims to alleviate at least to a certain extent at least one of the problems of the prior art. Alternatively, the present invention aims to provide a useful food pusher, food holder system incorporating a food pusher and/or mandoline.

SUMMARY

According to a first aspect of the present invention there is provided a food pusher for moving food relative to a work surface, the food pusher having a food pusher wall for pushing food relative to a work surface, the food pusher wall having a non-circular cross-section. This has the advantage that in a given amount of width or diameter of the food pusher, when the food pusher has a circular nature, a slot, open area or gap next to the food pusher wall for assisting in presenting food, such as vertical food in the nature of large carrots or cucumber, may have a significantly larger area and a significantly larger minimum cross-dimension than in a prior art arrangement with a circular through-bore.

The food pusher may have a support, the food pusher wall comprising a first pusher wall arranged to push food across a work surface, and in which a second pusher wall is provided for pushing food down onto the work surface, the second pusher wall being biased relative to the support. Thus, the food pusher may advantageously be able both to push food across a work surface of an arrangement such as a mandoline and may be also able to push food down onto the work surface for correctly presenting the food and gripping the food as it is presented to, for example, a cutting surface and/or cutting blade of a mandoline.

According to a second aspect of the present invention there is provided a food pusher for moving food relative to a work surface, the food pusher having a support, a first pusher wall arranged to push food across a work surface, and a second pusher wall for pushing food down onto a work surface, the second pusher wall being biased relative to the support. Not only are the advantages last described above provided therefore, but the bias may also be set such that a high ability in manual dexterity is not needed for pushing foods, especially soft food such as tomatoes or strawberries, down towards a work surface, such as one of a mandoline. The food is therefore not crushed and can be sliced or otherwise worked on very effectively.

In this case, the first pusher wall may have a non-circular cross-section.

In accordance with either of the above aspects of the present invention, the first pusher wall may extend with an extent substantially perpendicular to the second pusher wall. With the food pusher arranged for guided sliding along relative to a work surface of a mandoline considered as generally horizontal, the first pusher wall may extend in a generally vertical fashion therefore and the second pusher wall may be generally horizontal therefore. In practice, the work surface may be somewhat sloped.

The non-circular cross-section of the first pusher wall preferably comprises or includes a jaw-shaped wall portion. The jaw-shaped wall portion is highly advantageous since this wall portion may act upon food, such as vertical food in the nature of courgettes, carrots or cucumber, to push such food along to be cut or otherwise worked on at a mandoline work surface. By its nature, the jaw-shaped wall portion can push the food with a wedging action or at least with a component along the pushing direction at various angles of orientation of the food pusher relative to the direction of pushing. In particular, the food pusher may be rotatable relative to the work surface of a mandoline or a food holder for guiding the pusher along a mandoline and this may therefore easily enable both right- or left-handed persons to adopt a wide range of suitable pushing orientations of the food pusher relative to the mandoline work surface using either the right hand or the left hand to grip and push on the pusher. This arrangement contributes advantageously towards the food pusher being able to accept relatively large vertical food.

The jaw-shaped wall portion may have a central arcuate portion defining a substantially arcuate circularly cylindrical wall portion, preferably with at least one side portion located adjacent to the central arcuate wall portion.

The jaw-shaped wall portion may have at least one said side portion including at least one generally straight portion defining a substantially flat wall portion. The jaw-shaped portion may be wedge-shaped or substantially V-shaped or U-shaped.

The food pusher may have two said substantially flat wall portions of two respective said side portions, the substantially flat wall portions preferably being arranged angled relative to one another at an included angle of between about 20 and 270°, preferably between about 25 and 120°, typically between about 30 and 60°, between about 40 and 50° being one example. These advantageous ranges, especially the narrower ones, have been found to permit both a substantial area for the second pusher wall for pushing food down onto a work surface and a substantial gap or area within and/or next to the jaw-shaped wall portion for accommodating vertical food.

The first and second pusher walls may be configured with surfaces substantially perpendicular to one another. One surface may therefore be configured to push down substantially perpendicular to a mandoline surface and the other may be configured to push along substantially perpendicular to such a mandoline work surface.

The first and second pusher walls may be coupled to one another and/or may be formed integral with one another.

The second pusher wall may be substantially planar.

The second pusher wall may have a circularly arcuate guide edge portion which may be adapted to guide the food pusher relative to a substantially circular tubular support for the food pusher. Additionally or alternatively, the food pusher may have a support with a tubular skirt for guiding rotation and position relative to be a tubular support. The food pusher may therefore be easily rotatable relative to such a circular tubular support to enable pushing of the food pusher at different angled configurations relative to a work surface. This advantageously improves the adaptability of the pusher relative to some prior art arrangements in respect of operation by left or right hands of users. Where a bias is provided as mentioned above and in any event, a spring system may be provided for biasing the second pusher wall relative to the support.

A centre of pressure of the spring system may be near a centre axis of the food pusher. This advantageously provides for effective control of movement of the pusher walls of the food pusher with minimal friction and minimal tipping of the support walls so as to avoid wedge-shaped sliced food output since forces on the second wall from below which may in many cases be near the centre axis of the food pusher may be near the centre of pressure of the spring system, even though the food pusher is not symmetrical around the centre axis.

The support for the pusher walls may be provided with at least one pin adapted to pierce food, the pin slidably passing through an opening in the second pusher wall.

At least two said pins may be provided which are mounted to the support mutually spaced apart and arranged substantially parallel to one another, preferably at least 4 said pins.

The pins may be provided in a pattern whose periphery, i.e. an imaginary joining of centres of the pins, extends around at least one spring of the spring system. Advantageously, therefore, an item of food, particularly one that is relatively hard such as an apple, which has been speared by one or more of the pins, may provide reactive force onto the second support wall of the food pusher with a centre of effort which is relatively near to a centre of pressure of the spring system, such that a significant moment of rotation of the food pusher applied by these forces is avoided and this may have advantages in relation to friction and motion of the food pusher walls as well as in avoiding wedge-shaped slicing output.

According to a further aspect of the present invention there is provided a food holder system adapted to hold and move food relative to a work surface, the system including a food pusher as set out in either aspect above with or without any of the optional features discussed and a food holder, the food holder having at least one guide element for guiding the system along the work surface and a substantially circularly tubular guide collar for guiding movement of the food pusher relative to the work surface. This has the substantial advantage that a guided system with a rotatable food pusher may be provided since the food pusher may rotate around the circularly tubular guide collar.

The food pusher may have a circularly arcuate at least partly generally cylindrical support surface or skirt which is adapted to mate as a bearing with the circularly tubular guide collar permitting rotation of the food pusher relative to the food holder.

The system may incorporate a gap between the first pusher wall and the tubular guide collar through which food, such as vertical food e.g. in the nature of cucumber, courgette or carrot, may be pushed in a direction parallel to the first pusher wall and/or substantially perpendicular to the second pusher wall. The gap or open area both in area and minimum cross-dimension may be relatively large compared to the overall cross-dimension or diameter of the food pusher, such that a relatively small apparatus may easily operate on relatively large vertical foods such as cucumber, courgette or large carrot.

The shape and size of the open area are enabled by features of the aspects of the invention and/or preferred features. The open area can be as large as possible but still having an active pushing plate (second pusher wall) as large as possible or at least large enough. The open area does not extend outside the generally cylindrical skirt so that the pusher is infinitely rotatable relative to the food holder.

According to a further aspect of the present invention there is provided a food holder system adapted to hold and move food relative to a work surface, the system including a food pusher for moving food relative to a work surface and a guide support for guiding movement of the food holder, the food pusher including a wall surface and a bias which is adapted to push food towards the work surface, the wall surface being rotatable relative to the guide support. Advantageously, therefore, the bias, which may take the form of a spring system, may be set in strength or spring constant such that relatively delicate foods such as tomato or strawberry may be easily pressed with a suitable pressure down towards the work surface of an apparatus such as a mandoline without squashing them while still allowing the device to push them along and the device may be conveniently rotated to suit left- or right-handed operation or even to rotate the food pusher, if desired, as part of the mandoline operating function, for example to result in a new aspect or face of food being presented to the blades of a mandoline on each slide stroke, if desired by the user.

According to a further aspect of the present invention there is provided a culinary mandoline which includes a food holder system as set out in either aspect thereof discussed above and a work surface in the form of a substantially flat plate against which and along which the food pusher is arranged to push food. The mandoline, as will be apparent from the above discussion is therefore both useful and has a number of advantages relative to the prior art arrangements discussed above.

BRIEF DESCRIPTION OF THE FIGURES

The present invention may be carried out in various ways and an example of a food pusher, food holder system and mandoline in accordance with the invention will now be described by way of example only and with reference to the accompanying drawings, in which.

DETAILED DESCRIPTION

Figure 1:
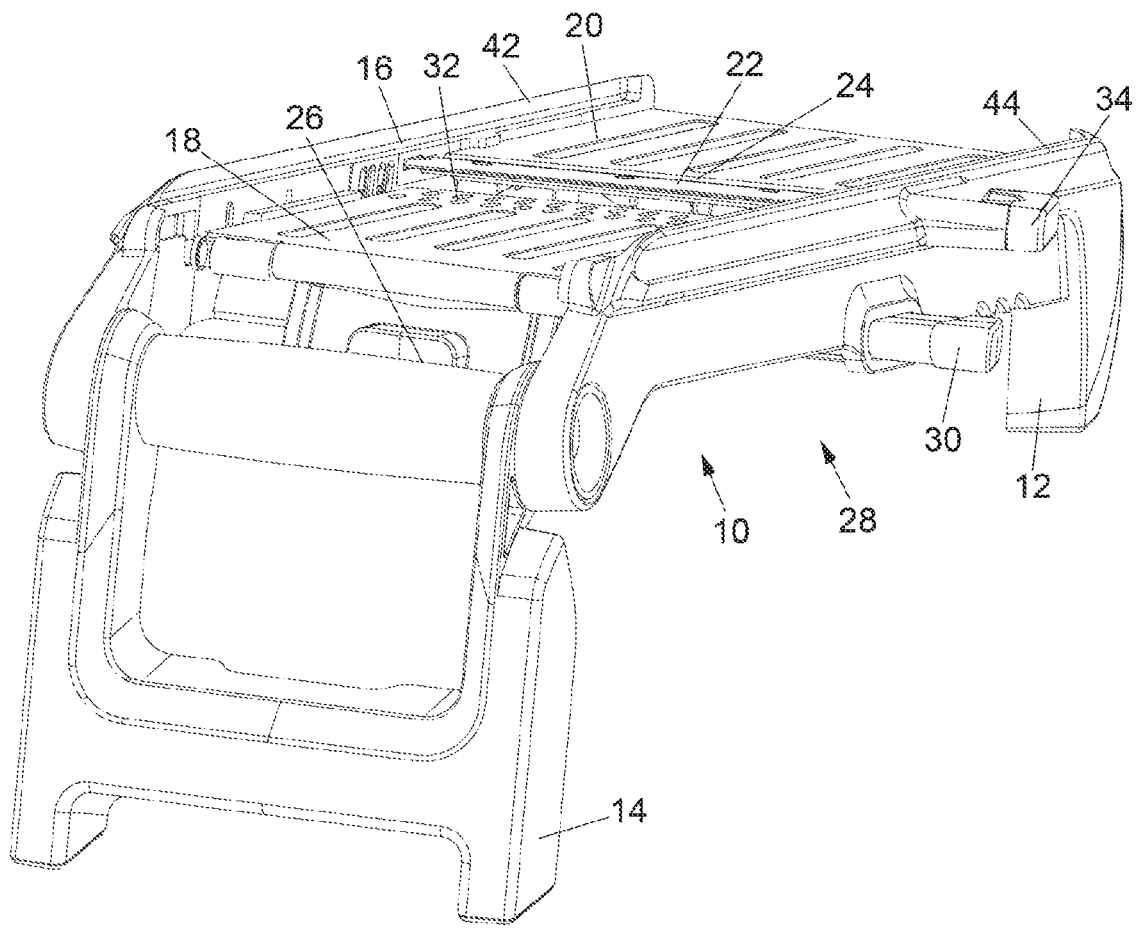
FIG. 1 shows a preferred embodiment of a mandoline body.

As shown in FIG. 1, a mandoline body 10 has feet 12, 14 for supporting the mandoline on a counter top (not shown) and a main platform 16 having a first plate 18, a second plate 20 and a cutting blade 22 at a leading edge 24 of the second plate 20. The height of the first plate 18 relative to the second plate 20 may be adjusted using a height adjuster 26 to vary the height gap between the cutting blade 22 and the first plate 18 so as to vary the thickness of slices cut off food, such as fruit or vegetables, or other material by the cutting blade 22 of the overall mandoline 28. For example, the first plate 18 is shown in FIG. 1 as noticeably lower than the second plate 20, whereas in FIG. 2 the first plate 18 has been raised up by the height adjuster 26 such that the first and second plates 18, 20 are at the same height as one another—a storage position—in which items sliding along the plates 18, 20 will not be cut by the cutting blade 22. The adjuster 26 adjusts the height of the plate 18 in a manner known or easily constructed by the skilled person in the art.

The mandoline body 10 also includes a julienne actuator 30 for raising a series of julienne blades (not shown) through a series of julienne slots 32 formed through the first plate 18 in order to perform julienne operations. The julienne blades and julienne actuator are optional features and may operate in a way known or easily constructed by the skilled person in the art.

The mandoline body 10 also has a blade handle 34 which can be pulled to remove the cutting blade 22 sideways from the mandoline body 10 for cleaning purposes and/or to replace the cutting blade 22 with a blade of another type. For example, the cutting blade 22 shown in the drawings has a straight or slightly serrated edge, whereas it may be replaced in this way with one having a crinkle-cut or other shape.

Figure 2:
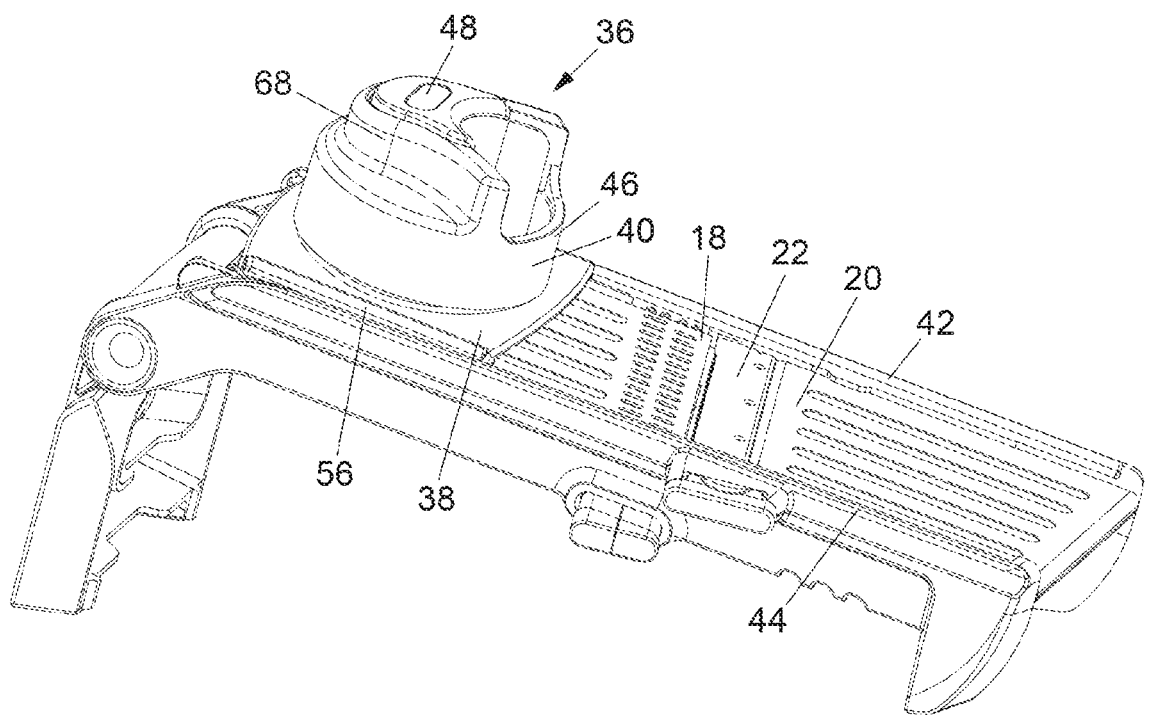
FIG. 2 shows the mandoline body with the food pusher and food holder by way of example fitted thereto.

As shown in FIG. 2, a food holder system 36 having a food holder 38 and a food pusher 40 may be adapted to slide along side rails 42, 44 of the mandoline body 18 with a motion along and parallel to the plane of the first and second plates 18, 20 in order to guide food to be sliced by the cutting blade 22.

Figure 10:
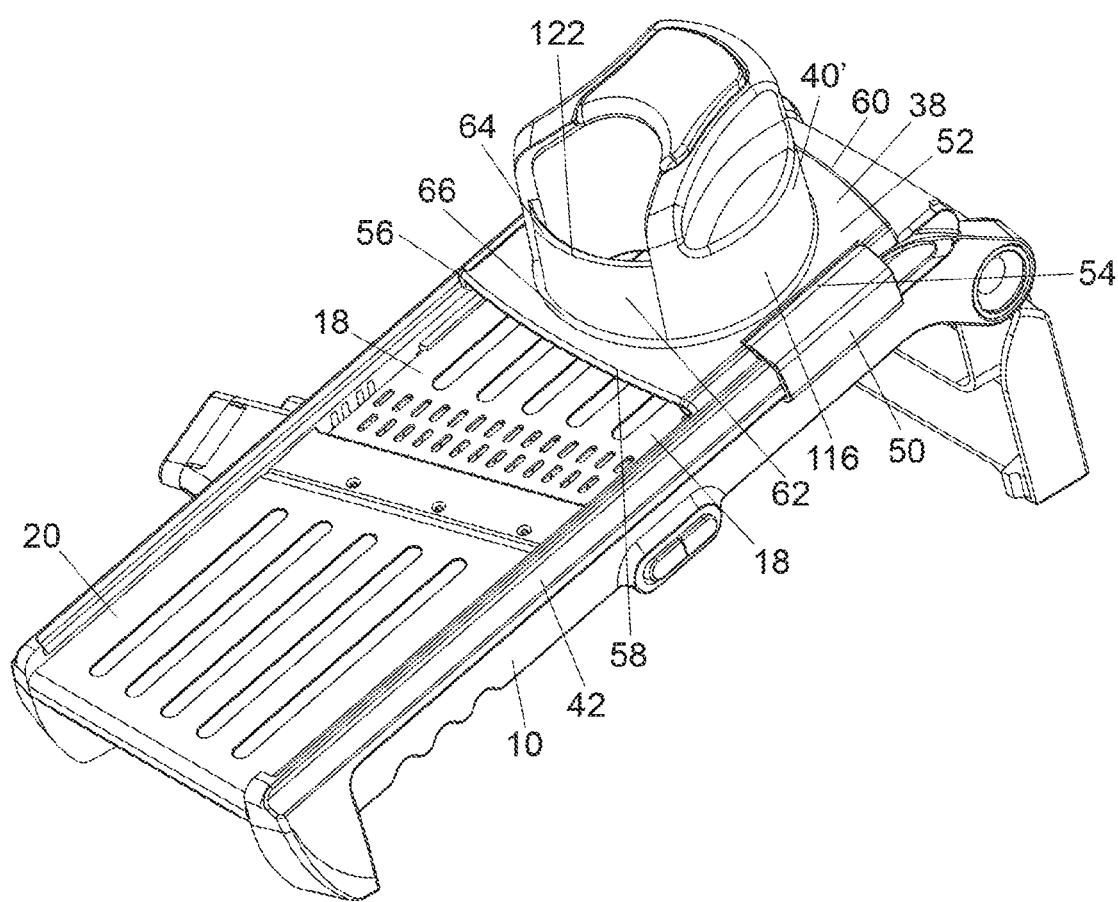
FIG. 10 shows the mandoline body and food holder of FIG. 2 with a modified food pusher.

FIG. 10 shows a modified arrangement, using the same mandoline body 10 and food holder 38 and with a food pusher 40' which is the same as the food pusher 40 shown in FIG. 2 apart from the omission of a front wall portion 46 of the food pusher 40 and the omission of a product name tab portion 48. As shown in FIG. 10, the food holder 38, which is the same as that used in FIG. 2, includes a side guide 50 which is arranged in shape so as to slidably mate with and slide along the side rail 42. It can also slide off either end, e.g. for cleaning purposes. A main body 52 is hingedly coupled to the side guide 50 at a hinge 54 which enables the main body 52 and food pusher 40 to be hinged up away from the first plate 18 to insert food under the food pusher 40 or remove it, as desired. A side bearing 56 of the main body 52 of the food holder 38 is arranged to rest on and slide along the side rail 44 such that the food holder system 36 may be driven along a linear path above the plates 18, 20 parallel to the direction of the side rails 42, 44. A front edge 58 and a rear edge 60 of the food holder 38 are spaced slightly above the height of the second plate 20 and the height of the first plate 18 when it is in its fully raised position coplanar with the second plate such that there is at least a slight gap between the plates 18, 20 and the underside of the food holder 38 and food pusher 40.

As shown in FIG. 10, the food holder 38 includes an upstanding cylindrical collar 62 which may be truly cylindrical or substantially cylindrical, e.g. somewhat conical or tapered in nature. The upstanding cylindrical collar 62 is fully open-ended inside at both of its top 64 and bottom 66 such that items of food may pass through the collar 62, in particular downwards through the collar into contact with the plates 18, 20 for slicing by the cutting blade 22.

Figure 3:
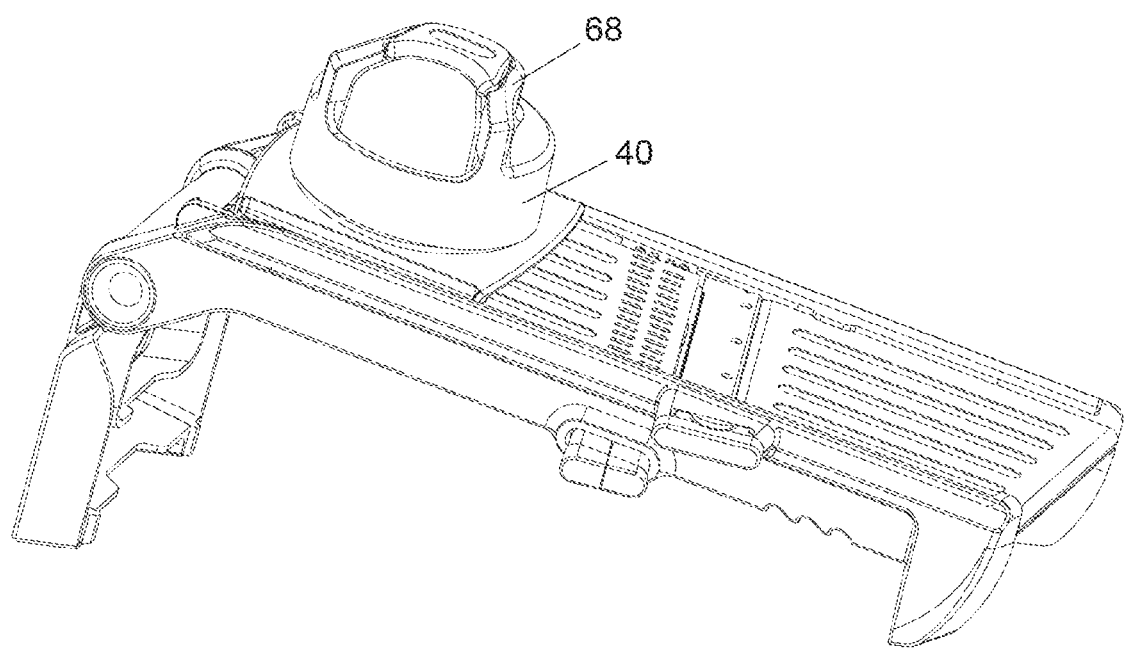
FIG. 3 shows the parts of FIG. 2 but with the food pusher rotated to a different position to that shown in FIG. 2.

It will be evident from a comparison of FIGS. 2 and 3 that the food pusher 40 (it is also true for the pusher 40') is rotatable about the food holder 38, i.e. about the central axis of the upstanding cylindrical collar 62. This allows a user gripping a handle portion 68 of the food pusher 40 to grip the food pusher 40 with the left hand or right hand in any desired rotational configuration for easy driving of the food pusher 40 by hand along the mandoline body 10 in order to slice food.

Figure 4:
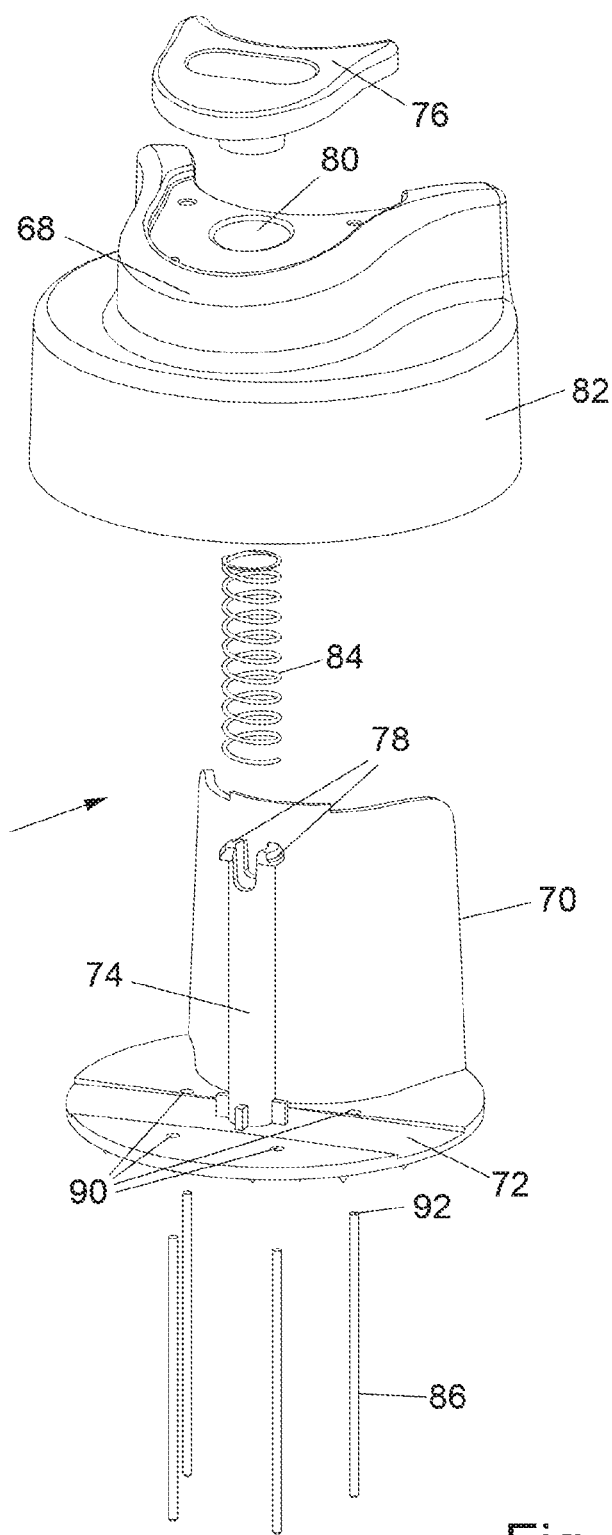
FIG. 4 shows an exploded view of the food pusher from one side.
Figure 5:
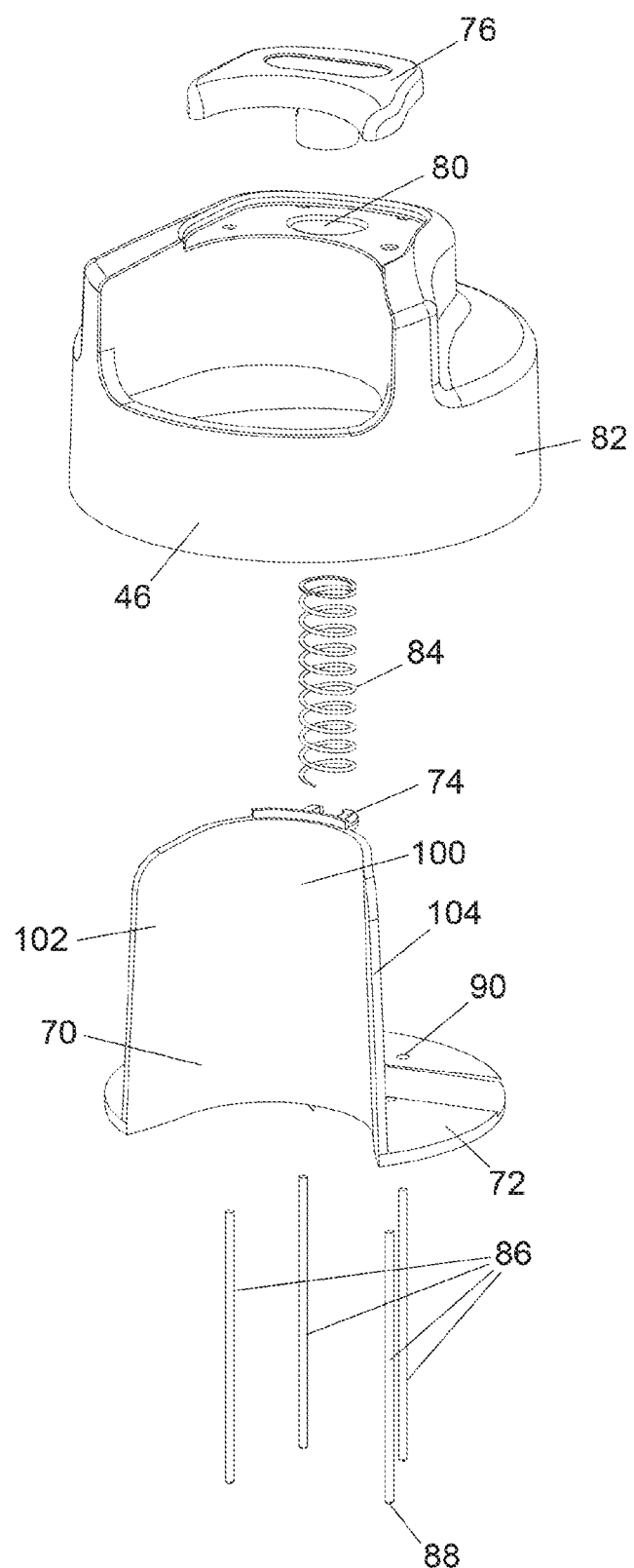
FIG. 5 shows an exploded view of the food pusher from another side.

As shown in the exploded views of FIGS. 4 and 5, the food pusher 40 includes, integrally formed together, a first pusher wall 70 and a second pusher wall 72 and guide rod 74. The guide rod 74 is securable to a top cap 76 by clips 78 through an aperture 80 of a support 82. The first and second pusher walls 70, 72, guide rod 74 and top cap 76 are biased downwardly away from the support 82 by a bias 84 which is preferably in the nature of a spring system such as a single helical spring 84. A series of metal pins 86, each with a sharpened lower tip 88, pass through respective throughholes 90 formed through the second pusher wall 72 which takes the form of a substantially flat plate arranged to be located in use substantially parallel to the first and second plates 18, 20. Top ends 92 of the pins 86 are fixedly secured into respective mounting points 94 formed in the support 82 as shown in FIG. 6 and FIG. 7A, for example.

Figure 6:
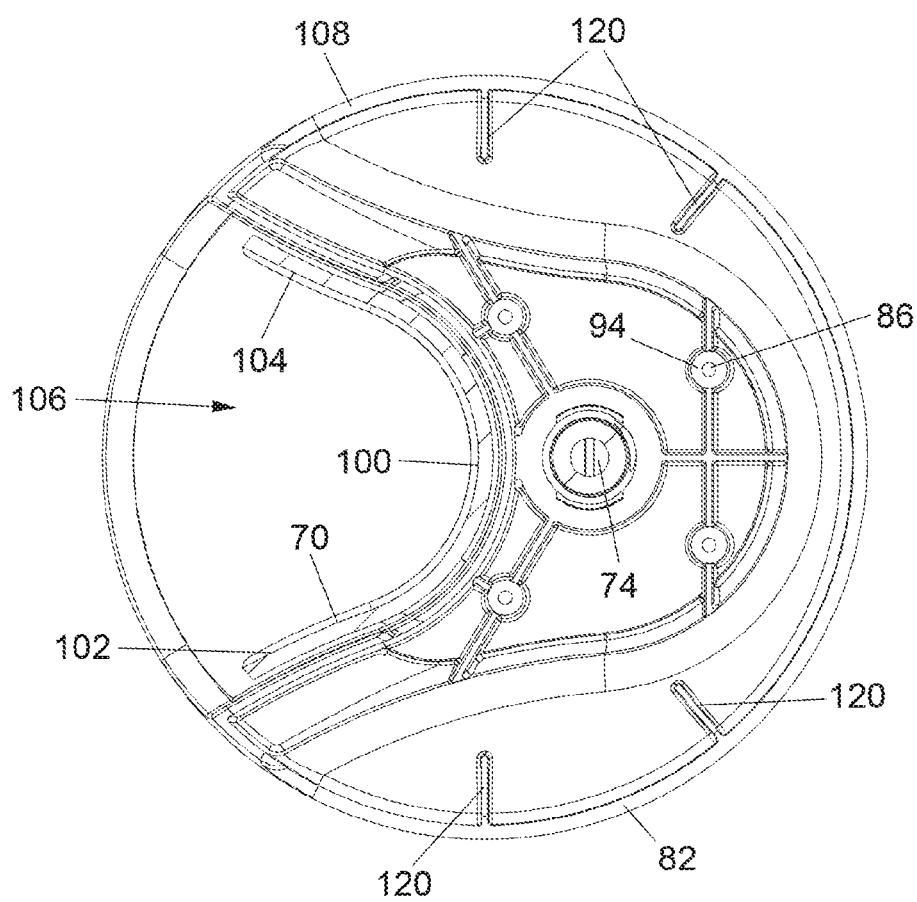
FIG. 6 shows a horizontal cross-section taken through the food pusher.
Figure 7A:
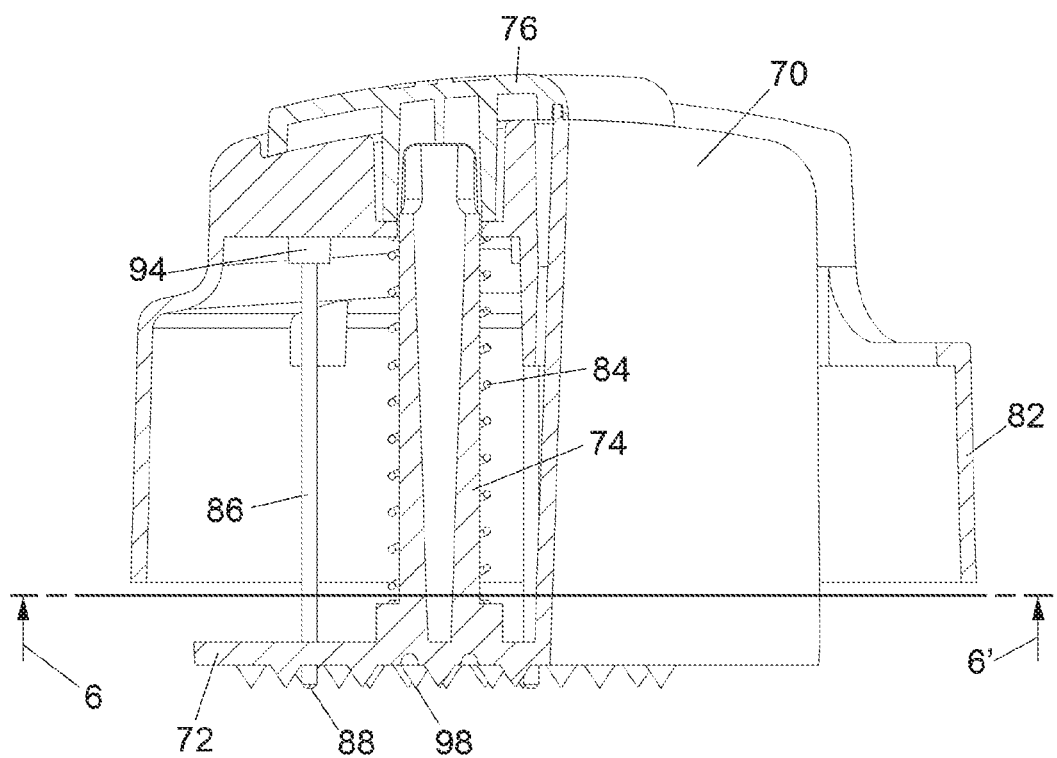
FIG. 7A shows a vertical section through the food pusher in one configuration and FIG. 7B shows the same parts in a second configuration.

It will be appreciated that FIG. 6 is a section looking up under the support 82 and taken on the plane 6-6' shown in FIG. 7A.

Figure 9A:
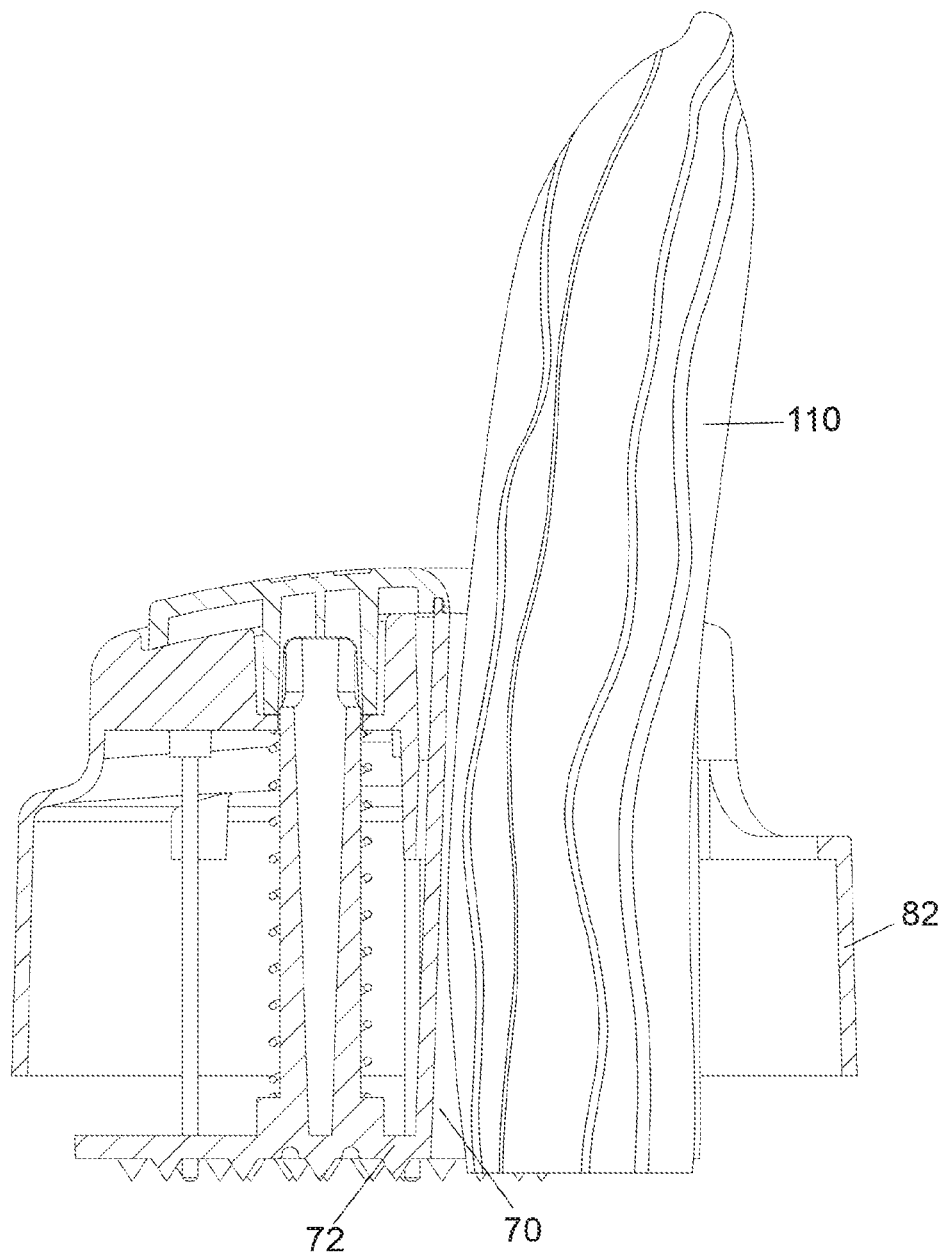
FIG. 9A shows the food pusher in the configuration of FIG. 7A and with a cucumber positioned to be pushed by the food pusher and FIG. 9B shows remains of the cucumber after a number of sliding operations of the food pusher along the mandoline.
Figure 9B:
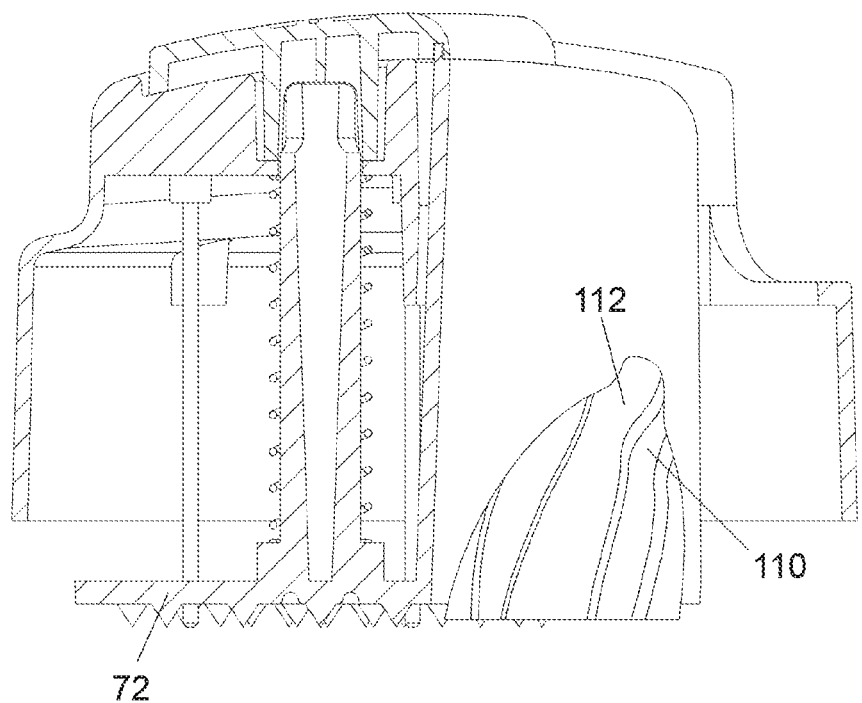

As shown in FIG. 7A onwards to FIG. 9B, the second pusher wall 72 includes a series of gripper elements 96 formed on an underside thereof, the gripper elements preferably being sharpened and/or preferably being in the form of conical elements with sharp tips 98 for gripping food. As shown in FIG. 4 through to FIG. 7B, for example, the first pusher wall is substantially upstanding in nature, i.e. arranged in use to be located with its surfaces generally or substantially perpendicular to the first and second plates 18, 20. The first pusher wall 70 may be substantially jaw-shaped in nature. The first pusher wall 70 may have a radiused or otherwise curved central portion 100 as well as side portions 102, 104. The side portions 102, 104 may be substantially flat or somewhat curved and indeed with the central portion 100 being generally concave, the side portions 102, 104 may be generally or substantially flat, or slightly or more substantially curved being outwardly concave or convex. In the specific embodiment shown in FIG. 6, the side portions 102 are substantially flat although very slightly outwardly convex and they are oriented relative to one another at an included angle of approximately 40 to 50°. As will be seen in FIG. 6, the first pusher wall 70 is therefore somewhat V-shaped, U-shaped or rounded valley-shaped in cross-section taken in a plane generally parallel to the second pusher wall 72. As shown in FIG. 6, the result of this configuration is a substantial open area or gap 106 to the side of the first pusher wall 70 and within the outer periphery 108 of the food pusher 40 through which vertical foods such as cucumber or large carrots may be pushed down by hand towards the plates 18, 20 and pushed sideways by the first pusher wall 70, thereby allowing foods with a substantial cross dimension or cross-sectional area to be operated on and sliced by the cutting blade 20 using the food pusher 40 to provide the sideways pushing force along the direction of the plates 20, 22. Thus, FIG. 9A shows a cucumber 110 of substantial cross-sectional area and cross dimension which can be pushed down through the open area 106 towards the plates 18, 20 and pushed along by the first pusher wall 70. FIG. 9B shows a remainder portion 112 of the cucumber 110 after several slicing operations incorporating pushing of the cucumber 110 by the pusher 40.

Figure 7B:
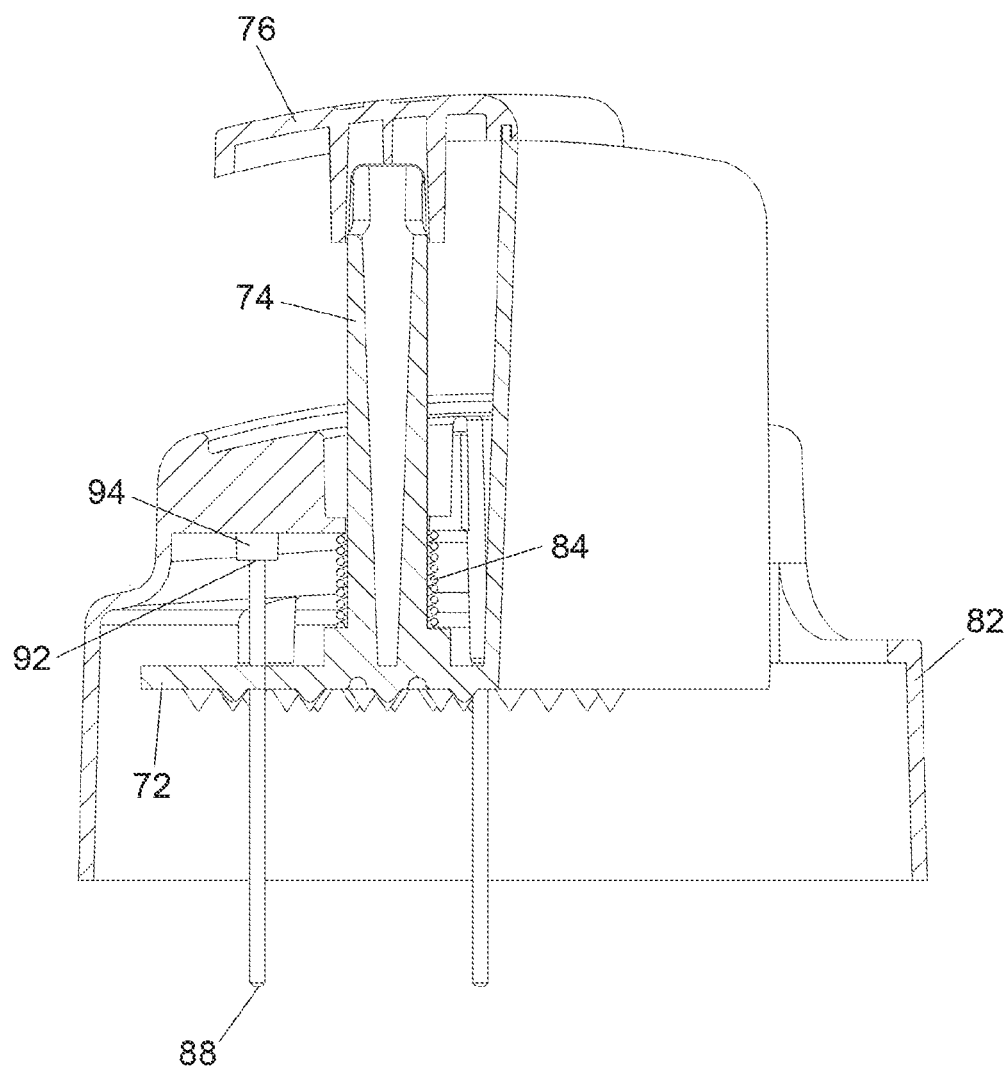

FIGS. 7A and 7B show how the pusher walls 70, 72, guide rods 74 and top cap 76 may move up and down relative to the support 82, being biased down away from the support 82 via the bias 84.

Figure 8A:
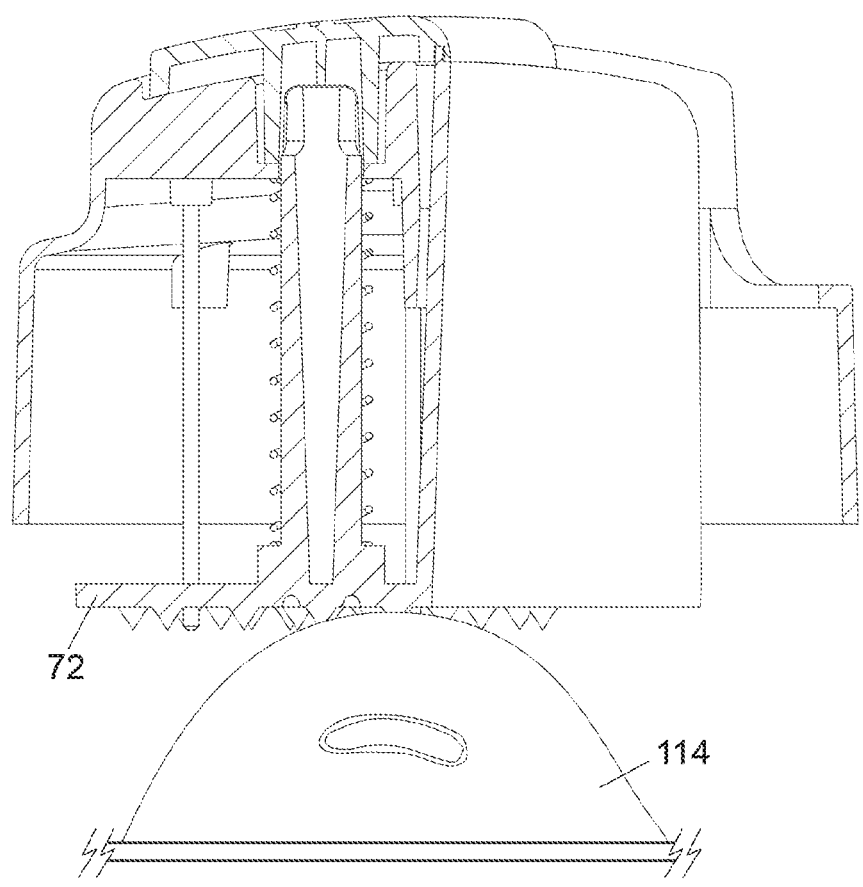
FIG. 8A shows the food pusher in the configuration of FIG. 7A arranged to push on a potato and FIG. 8B shows the parts of FIG. 8A in a different configuration.
Figure 8B:
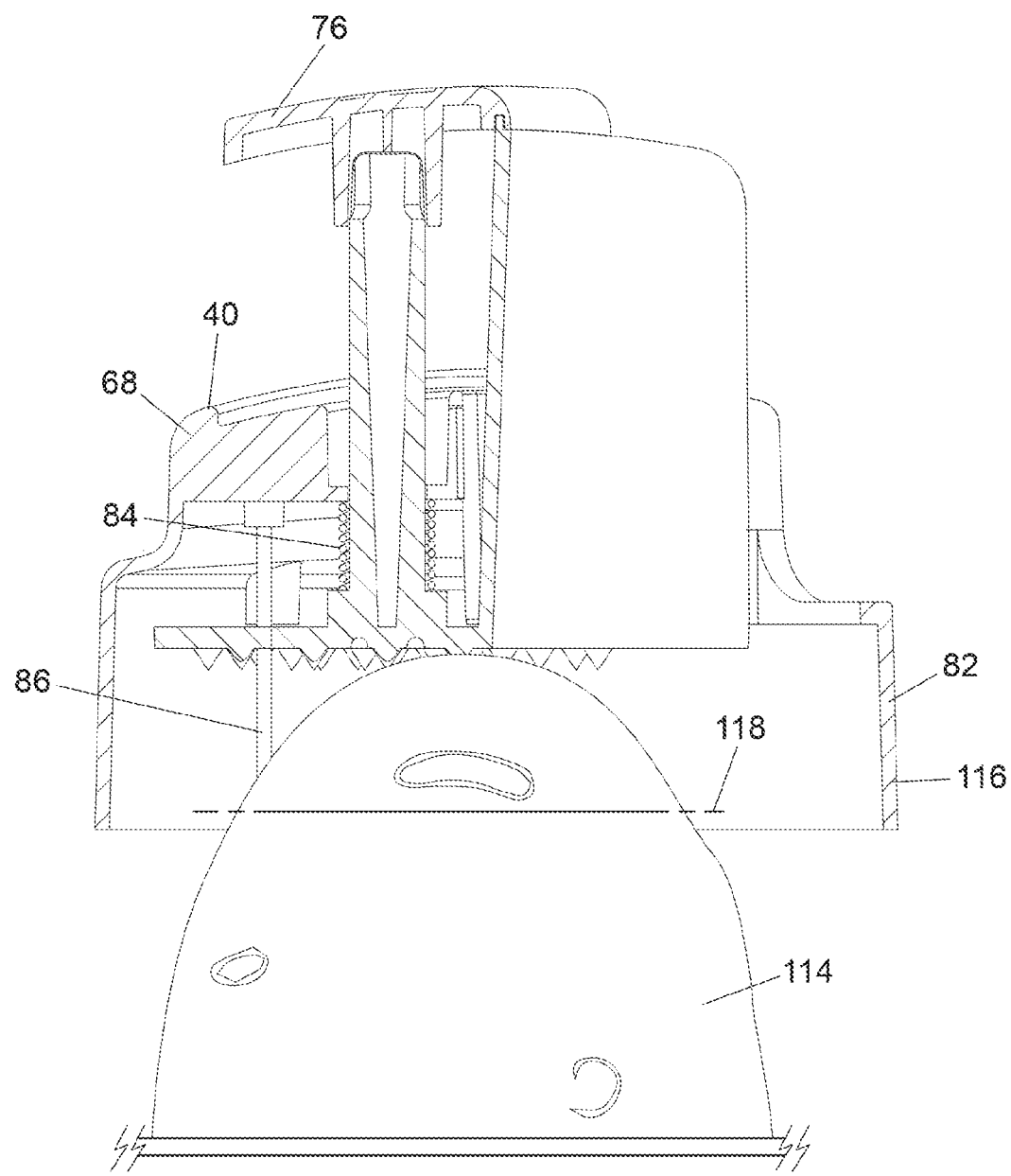

As shown in FIG. 8A, a foodstuff such as a potato 114 may be engaged by the second pusher wall 72. As shown in FIG. 8B, in which more of the potato 114 is shown than in FIG. 8A, the support 82 may be pushed down onto the potato 114, inserting the sharp pins 86 into the potato 114 and pushing the second pusher wall 72 up, together with the first pusher wall 70, guide rod 74 and top cap 76. With the potato 114 cut by a knife to a shorter height than that shown in FIG. 8A, a generally cylindrical although optionally slightly tapered skirt 116 of the support 82 of the food pusher 40 may mate around the upstanding substantially cylindrical collar 62 of the food holder 38 for guided slicing of the potato 114 by pushing on the handle portion 68 of the food pusher 40 for slicing the potato 114 using the cutting blade 22. As the potato 114 becomes shorter in height than approximately the level of the plane 118 shown in FIG. 8B, the bias 84 may with each further slicing cut push the second pusher wall 72 and potato 114 down to move downwardly with each cut towards a configuration as shown in FIG. 8A of the second pusher wall 72 in which the tips 98 of the grip elements 96 are located just above the plane of the second plate 20 and the cutting blade 22.

It will be appreciated that the skirt 116 is substantially circular in nature, enabling the support 82 to be rotated around on the upstanding cylindrical collar 62. The support 82 may be provided with bearings 120 as shown in FIG. 6 for engaging upon top surface 122 of the upstanding cylindrical collar 62 when the support 82 is fully lowered relative to the food holder 38.

It will be appreciated that the food holder 38 need not necessarily be used with the food pusher and the food pusher may be operated by sliding it along the first and second plates 18, 20 guided simply by hand of the user.

With foodstuff under the second pusher wall 72 and being pushed against the plates 18, 20 by the bias 84, by noting the height of the top cap 76 and first pusher wall 70 relative to the support 82, the user is advantageously able to tell how much height of foodstuff is left under the second pusher wall 72 without necessarily being able to see the foodstuff in question.

Figure 11:
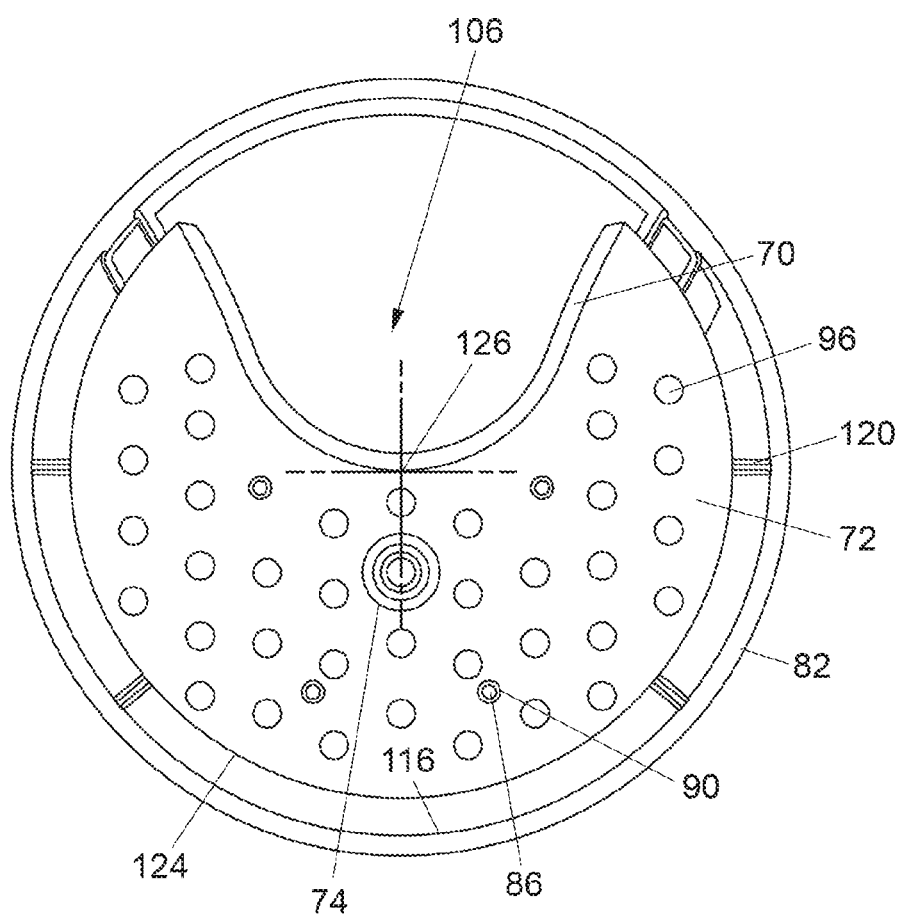
FIG. 11 shows a view of the food pusher from below, showing the shape of pusher walls thereof.

As shown in FIG. 11, the second pusher wall 72 has an arcuate edge 124 which is circular but does not form a whole circle, extending around about 310 to 320° of the circle to the open area defined by the jaw-shaped first pusher wall 70. This may assist in guiding rotation of the food pusher 40 and may, with sideways force applied to the pusher, assist in resisting tilting of the pusher walls 70, 72.

As shown in FIG. 11, the guide rod 74 and its bias 84 are located relatively close to a central axis 126 of the food pusher, which may be defined by a central axis 126 of the skirt 116. The guide rod 74 and bias 84 which form the centre of pressure of the spring or bias system operating on the second pusher wall 72 are relatively close to this axis such that twisting of the second pusher wall 72 due to forces applied to the second pusher wall 72 by the bias 84 and foodstuffs does not easily occur, causing friction which would resist the sliding motion of the pusher walls 70, 72 relative to the support in the up/down direction and also potentially causing wedge-shaped slicing output. Also, the guide rod 74 and bias 84 are relatively closely positioned to the centre of pressure of the total area of the second pusher wall 72 facing downwardly. This is also advantageous for the same reason. Furthermore, the four pins 86 are spaced around the guide rod 74 such that the guide rod 74 and bias 84 are within a perimeter which could be drawn in an imaginary fashion by connecting the four pins 86 with straight lines as shown in FIG. 11. Therefore, forces applied to the second pusher wall 72 at or near to several of the pins 86 due to food located at these pins, in particular several of them, may be spaced around the guide rod 74 relatively easily.

The use of the bias 84 is advantageous in that with relatively soft produce such as tomatoes, grapes or strawberries, the forces downwardly on the produce applied by the second pusher wall 72 may be well controlled such that the produce is not easily squashed as can be the case in prior arrangements where manual forces could be disadvantageous in some circumstances.

The jaw-shaped first pusher wall 70 advantageously allows large items to be pushed down through the open area 106, such as vertical foods such as cucumbers or large carrots while still allowing the food pusher to be rotatable.

The layout of the pins 86 which may be of various types of configuration such as trapezium-shaped, as shown in FIG. 11, enables the bias 84 to be kept relatively centred relative to the centre of pressure of the second pusher wall total area as well as the central axis 126 of the food pusher 40.

The first pusher wall 70 allows, with a given cross dimension or diameter of the skirt 116 a very significant cross-sectional area for the open area 106 while still allowing a significant area for the second pusher wall 72, the non-circular open area 106 provided adjacent the first pusher wall 70 allowing much bigger vertical foods to be operated on than in prior art arrangements with circular holes for vertical foods.

An advantage of the location of the guide rod 74 and bias 84 and spring system generally being close to the central axis 126 of the food pusher 40 and/or centre of pressure of the second pusher wall 72 is that the second pusher wall 72 is unlikely to be tilted by forces acting on it, thereby avoiding wedge-shaped slices being produced by the action of the motion of the food pusher 40 and second pusher wall 72 relative to the cutting blade 22.

The handle portion 68 of the food pusher is tapered or wedge-shaped, advantageously enabling hands of different sizes to grip the pusher, so that the pusher can easily be operated both by people with large hands and relatively smaller hands.

Instead of arranging the pins 86 in a trapezium-shaped or generally square configuration, other configurations such as Y-shaped are envisaged and numbers of pins other than four pins, such as three, five, six, eight or ten are also envisaged for other embodiments. The pins may, as in the present embodiment, or other embodiments, be located relatively close to one another such that more than one may still grip on the small surface/volume left of a tapered or circular object, such as an onion, which has been already sliced several times.

The front wall portion 46 of the skirt 116 of the food pusher 40 is optional, as shown by the differences between FIG. 2 and FIG. 10, although the presence of this front wall portion may increase the rigidity of the food pusher 40.

A number of further modifications are envisaged and further modifications may be made to the specific embodiment described without departing from the scope of the invention as defined by the accompanying claims.

What is claimed is:

1. A food pusher for moving food relative to a work surface, the food pusher comprising a support and a food pusher wall for pushing food relative to the work surface, the food pusher wall comprising a first pusher wall arranged to push food across the work surface and a second pusher wall for pushing food down onto the work surface, wherein the first pusher wall has a non-circular cross-section comprising a jaw-shaped wall portion, wherein the food pusher wall is biased downwardly away from the support by a bias, and wherein the first and second pusher walls are coupled to one another, formed integral with one another, or both.

2. A food pusher as claimed in claim 1, wherein:
the first pusher wall extends with an extent substantially perpendicular to the second pusher wall;
the jaw-shaped wall portion includes a central arcuate wall portion and first and second substantially flat wall portions located adjacent to the central arcuate wall portion; and
the first and second substantially flat wall portions are arranged angled relative to one another at an included angle of between about 20 and 270 degrees.

3. A food pusher as claimed in claim 1, wherein the first and second pusher walls are configured with surfaces substantially perpendicular to one another.

4. A food pusher as claimed in claim 1, wherein the second pusher wall is substantially planar and includes a circularly arcuate guide edge portion.

5. A food pusher as claimed in claim 1, further comprising a spring system for biasing the second pusher wall relative to the support.

6. A food pusher as claimed in claim 5, wherein a center of pressure of the spring system is near a center axis of the food pusher.

7. A food pusher as claimed in claim 1, wherein:
the support includes at least one pin adapted to pierce food; and the pin passes through an opening in the second pusher wall.

8. A food pusher as claimed in claim 7, wherein the at least one pin comprises at least two pins which are mounted to the support mutually spaced apart and arranged substantially parallel to one another.

9. A food pusher as claimed in claim 7, wherein the at least one pin comprises at least 4 pins provided in a pattern whose periphery extends around at least one spring of a spring system for biasing the second pusher wall relative to the support.

10. A food holder system adapted to hold and move food relative to a work surface, the system comprising:
a food pusher as claimed in claim 1; and
a food holder including at least one guide element for guiding the system along the work surface and a circularly tubular guide collar for guiding movement of the food pusher relative to the work surface.

11. A food holder system as claimed in claim 10, wherein the food pusher is rotatable relative to the circularly tubular guide collar.

12. A food holder system as claimed in claim 10, wherein there is a gap between the first pusher wall and the tubular guide collar through which food may be pushed in a direction parallel to the first pusher wall, in a direction substantially perpendicular to the second pusher wall, or both.

13. A food holder system adapted to hold and move food relative to a work surface, the system comprising:
a food pusher as claimed in claim 1 for moving food relative to a work surface; and a guide support for guiding movement of the food holder; wherein:
the food pusher includes a wall surface and the bias is adapted to push food towards the work surface; and
the wall surface is rotatable relative to the guide support.

14. A culinary mandoline comprising:
a food holder system as claimed in claim 13; and
a work surface in the form of a substantially flat plate against which and along which the food pusher is arranged to push food.

* * * * *